Aug. 12, 1958  W. A. BEDFORD, JR  2,846,701
METHOD OF FORMING A SHEET METAL LOCK NUT
Original Filed Oct. 12, 1950
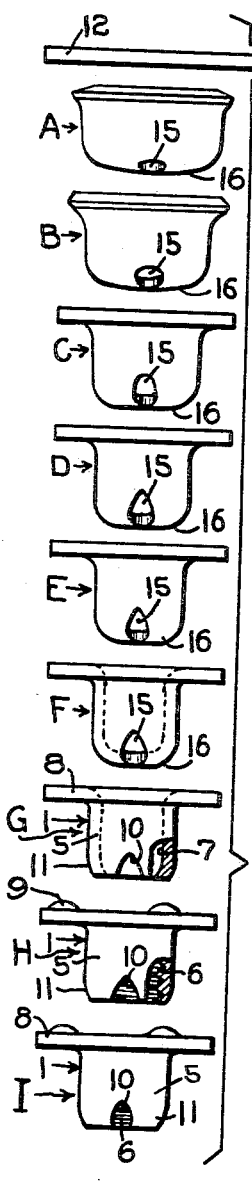
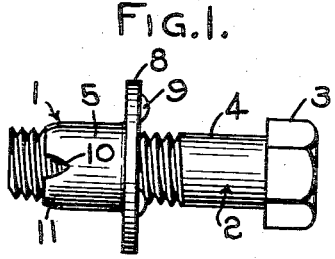
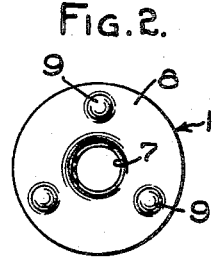
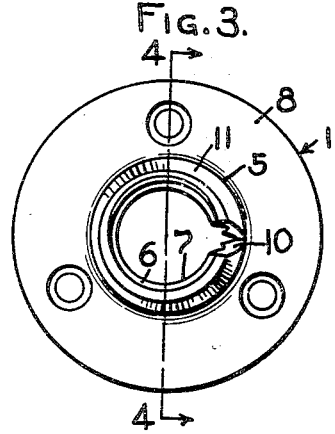
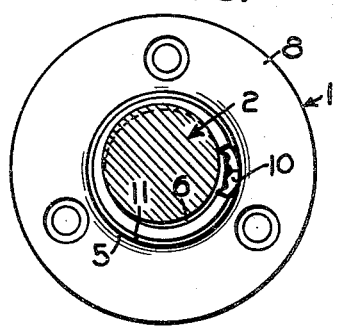
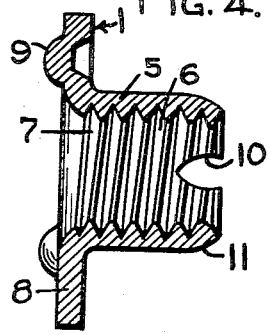
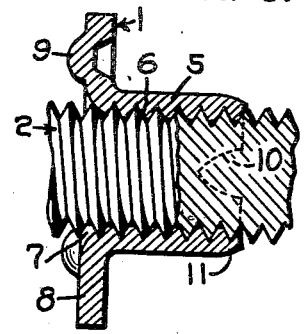
INVENTOR:
WILLIAM A. BEDFORD JR.
By Robert E. Ross
AGENT.

United States Patent Office 2,846,701
Patented Aug. 12, 1958

2,846,701

METHOD OF FORMING A SHEET METAL LOCK NUT

William A. Bedford, Jr., North Scituate, Mass., assignor to United-Carr Fastener Corporation, Cambridge, Mass., a corporation of Delaware Original application October 12, 1950, Serial No. 189,780. Divided and this application March 10, 1955, Serial No. 493,415

1 Claim. (Cl. 10—86)

This invention relates to self-locking nuts and to the method of making the same, and aims generally to improve the construction and manufacture of this type of nut.

This application is a division of my copending application Serial No. 189,780, filed October 12, 1950.

A primary object of the invention is the provision of a self-locking nut of improved construction which may be manufactured more economically and more quickly than previous nuts of this type.

A further object of the invention is the provision of a self-locking nut having a more effective gripping action than previous nuts of this type and which will retain a higher perecentage of its gripping power than previous nuts under the same conditions of use.

A still further object of the invention is the provision of a self-locking nut which may be threaded with a standard tap thereby eliminating the need for special taps in the manufacture thereof.

Another object of the invention is to improve the method of manufacture of nuts of the type herein disclosed whereby greater economy and speed in such manufacture may be obtained.

These and other aims and advantages of the invention will be apparent to persons skilled in the art from a consideration of the accompanying drawings and annexed specification illustrating and describing a preferred construction embodying the invention.

In the drawing:

Fig. 1 is a side view of the nut assembled with a bolt;

Fig. 2 is a bottom plan view of the nut;

Fig. 3 is a top plan view of the nut;

Fig. 4 is a cross-sectional view of the nut taken on the line 4—4 of Fig. 3;

Fig. 5 is a view of the nut similar to Fig. 4 with a bolt assembled therein;

Fig. 6 is an end view, partly in section, of the assembly of Fig. 5; and

Fig. 7 is a diagramatic view showing the nut at various stages in the manufacture thereof starting from the blank.

Referring to the drawing the numeral 1 designates the improved self-locking nut of the invention which is designed to be screwed on a bolt 2 in self-locking engagement therewith. The bolt 2 may be of any suitable kind and is preferably of a standard type having a square or hexagonal head 3 and a threaded shank 4.

The nut 1 is preferably formed from sheet metal of suitable thickness and comprises a substantially tubular body portion 5 open at the ends and threaded on the interior thereof as shown at 6. The threads 6 are preferably standard threads of substantially uniform depth and pitch and extend throughout the bore 7 for threaded engagement with the threaded shank 4 of the bolt 2.

Adjacent one end the tubular body portion 5 is provided with an outwardly extending flanger base portion 8 having pressed-out portions 9 on one face thereof to facilitate attachment to a support by spot welding or similar means.

At its opposite end the tubular body portion 5 is provided with a V-shaped slot 10 extending inwardly from the end edge thereof and the end portions on either side of the slot 10 are crimped inwardly after the nut is threaded to partially close the slot in a manner to be hereinafter described. This forms an end portion 11 of reduced diameter in which the threads 6, though of uniform depth and pitch, are reduced in diameter relative to the remaining threaded portion of the nut. By virtue of this construction insertion of a bolt into the nut and through the reduced end portion thereof causes a circumferential expansion of the metal at the reduced end portion 11 on each side of the slot 10, thus providing a highly effective gripping and locking action.

The nut 1 is preferably formed from a round sheet metal blank 12 of a diameter and thickness to provide a nut of the desired size and strength. The blank 12 is formed to the desired shape and size by a plurality of drawing or other forming operations, after which it is punched to provide a uniformly sized opening therethrough, internally threaded and then crimped inwardly at the end to form the locking portion of reduced diameter.

In accordance with the invention the slot 10 in the tubular body portion is formed simultaneously with the shaping of the blank, thereby eliminating an additional slot-forming operation which would otherwise be required. This is accomplished by forming an opening 15 in the blank in such a position that subsequent drawing operations elongate the opening along the wall of the tubular body portion. The opening 15 is preferably formed in the blank with a punch or other suitable means at the conclusion of the first drawing operation as shown in drawing A of Fig. 6. Subsequent drawing operations then elongate the opening as shown in drawings B through F, the final shape of the opening being shown in drawing F.

The opening 15 is positioned in the bottom of the cup-shaped member shown in drawing A adjacent the edge thereof so that subsequent drawing operations will elongate it along the wall of the tubular body portion. The size of the opening may be varied and will depend primarily on the size of the slot desired in the finished nut. For a ⅜ inch nut a ⅛ inch diameter opening properly positioned in the bottom of the cup-shaped member (drawing A, Fig. 6) has been found to work out very satisfactorily.

When the blank has been formed to the shape shown in drawing F (Fig. 6), with the elongated opening 15 therein, the closed end 16 of the tubular body portion is removed along a line which intersects the opening. The portion of the opening remaining in the tubular body portion thus forms the V-shaped notch 10 as shown in drawing G. Removal of the end 16 is preferably accomplished by a punching operation which simultaneously removes the end 16 and provides a uniformly sized opening through the tubular body portion.

Following the punching operation the tubular body portion 5 is tapped with a standard tap to provide the threads 6. By virtue of the uniform size of the opening in the tubular body portion and the crimping operation hereinafter described, the use of a standard tap is possible and the threads 6 become standard threads of uniform pitch and depth.

The locking feature is obtained by crimping the end of the tubular body portion inwardly to partially close the slot 10 as shown in drawing 1 of Fig. 7. The crimping operation is preferably accomplished by means of a conical die which is forced down onto the end of the nut. The resultant crimping is not uniform about the periphery, but instead, the greatest amount of inward movement occurs in the portion of the end which is adjacent the slot, and the least amount of inward movement occurs in the portion of the end which is directly opposite the slot. This forms an end portion 11 which has a size less than the rest of the body, and which must be expanded when a bolt is screwed into the nut. The slot 10 and the resiliency of the metal permit such expansion to take place in such a manner that the end portion 11 expands circumferentially, with the greatest amount of expansion occuring adjacent the slot. As illustrated in Fig. 6, the insertion of the bolt causes the edges of the slot to move away from each other, indicating that the expansion is not radial, but circumferential, so that the nut is frictionally engaged about substantially the entire circumference to securely lock it into position.

The pressed-out portions 9 in the flanged base portion 8 may desirably be formed between the threading and crimping operations although this is not essential.

It will thus be seen that the present invention provides an improved self-locking nut and method of making the same.

The improved construction has been found to provide a more effective gripping and locking action than in previous nuts of this type and to maintain a greater proportion of such gripping action than previously after the same number of insertions of a bolt.

Although I have illustrated and described one preferred form of my invention, I do not wish to be limited thereby as the scope of the invention is best defined by the appended claim.

I claim:

The method of forming a self-locking nut from a sheet metal blank comprising drawing a sheet metal blank to form a cup-shaped member having a base portion and a peripheral wall portion extending upwardly therefrom, forming a single opening off-center in the base portion immediately adjacent the peripheral wall portion, drawing the cup-shaped member to force material of the periphery of the base portion into the wall portion and to transfer a portion of the opening to the wall portion and to stretch the wall longitudinally with a corresponding elongation of the opening transferred thereto, cutting the base portion from the wall portion along a line passing through the opening with the end of the wall having a notch formed by the portion of the aperture transferred thereto, internally threading the side walls and inwardly crimping the end of the wall adjacent the notch so that opposite sides thereof will be inclined radially inwardly to restrict the bore for frictional engagement with a bolt, the amount of inward inclination of said inclined end progressively increasing toward the notch from a point substantially diametrically opposite said notch.

References Cited in the file of this patent

UNITED STATES PATENTS

| | | |
|---|---|---|
| 2,287,691 | Marchou | June 23, 1942 |
| 2,347,852 | Thompson | May 2, 1944 |
| 2,609,596 | Clark | Sept. 9, 1952 |